Aug. 1, 1967  R. H. L. BAHOUT  3,333,836
CLOSURE ELEMENTS FOR PLATES OF FLUID EXCHANGE COLUMNS
Filed Jan. 8, 1963  5 Sheets-Sheet 1

RENÉ H. L. BAHOUT
INVENTOR

BY Stevens, Davis, Miller & Mosher
ATTORNEYS

RENÉ H. L. BAHOUT
INVENTOR

Aug. 1, 1967  R. H. L. BAHOUT  3,333,836
CLOSURE ELEMENTS FOR PLATES OF FLUID EXCHANGE COLUMNS
Filed Jan. 8, 1963  5 Sheets-Sheet 3

RENÉ H. L. BAHOUT
INVENTOR

BY *Stevens, Davis, Miller & Mosher*
ATTORNEYS

FIG. 20.
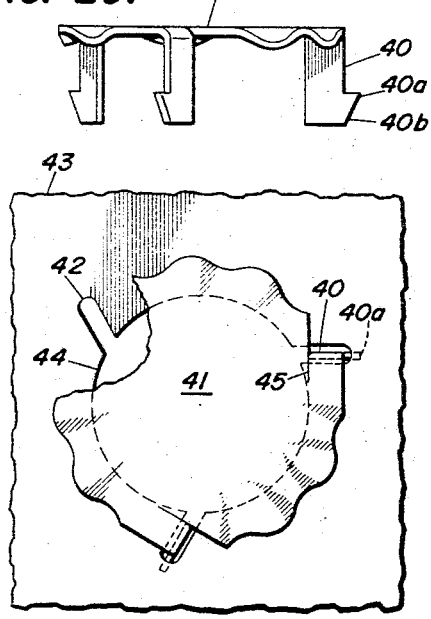
FIG. 21.
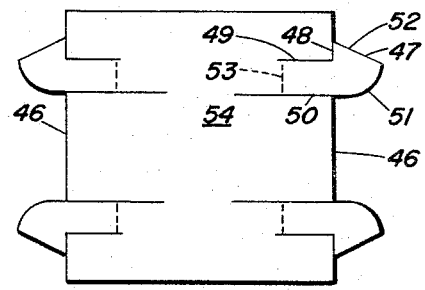
FIG. 22.
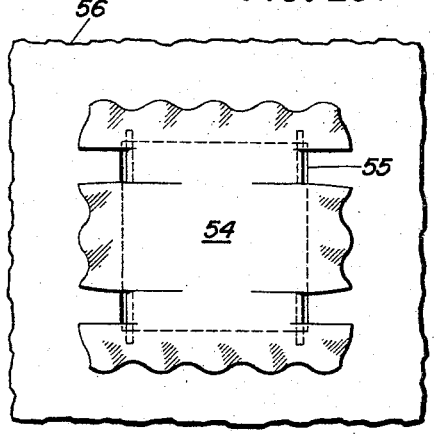
FIG. 23.
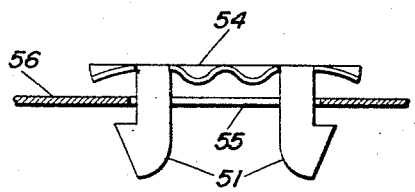
FIG. 24.
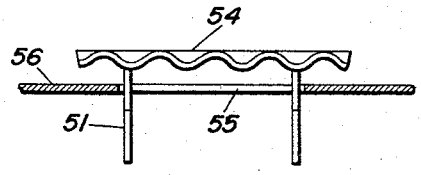
FIG. 25
INVENTOR
RENÉ H. L. BAHOUT Aug. 1, 1967  R. H. L. BAHOUT  3,333,836
CLOSURE ELEMENTS FOR PLATES OF FLUID EXCHANGE COLUMNS
Filed Jan. 3, 1963  5 Sheets-Sheet 5

INVENTOR
RENÉ H. L. BAHOUT

BY *Stevens, Davis, Miller & Mosher*
ATTORNEYS

United States Patent Office 3,333,836
Patented Aug. 1, 1967

3,333,836
CLOSURE ELEMENTS FOR PLATES OF FLUID EXCHANGE COLUMNS
René Henri Louis Bahout, Argenteuil, France, assignor to Societe pour l'Equipement des Industries Chimiques— S.P.E.I. Chim—Reunion des Anciens Etablissements Barbet, Egrot & Grange, Pingris & Mollet-Fontaine, Paris, France, a company of France
Filed Jan. 8, 1963, Ser. No. 250,090
Claims priority, application France, Jan. 11, 1962, 884,587, Patent 1,318,779
4 Claims. (Cl. 261—114)

This invention relates to closure elements for plates of fluid exchange columns, and to such plates and columns.

As is known, in columns for exchange between liquid or gaseous fluids forming different phases, for example distillation, absorption, scrubbing and extraction columns, the plates may be formed with apertures which are adapted to be masked or unmasked by flat or domed shape movable elements, which are called closure elements. These elements, whether solid or perforated, rest on their seat by gravity and are raised by the rising flow of gas or vapor or of the lighter liquid when the differential pressure exceeds a certain value.

It has already been proposed to provide such flat or dome-shaped closure elements with a number of projections distributed around the periphery with the object of preventing the plate from sticking in the stationary position.

An object of the present invention is to provide an improved closure element.

In accordance with one feature of the invention, there is provided a closure element for partly closing an aperture in a plate of a fluid exchange column, such element comprising a cap corrugated around its periphery, the lower portions of the corrugations being adapted to rest on the portion of the plate surrounding the aperture leaving therebetween passages for the upward flow of gas or vapor. The upward flow is thus dispersed and the efficiency of the exchanges is improved, more especially at low rates of flow, while the element still rests on the plate.

The cap-like element thus designed may be combined with a device for guiding its upward movement, more especially with means for limiting the upward movement. The said device may be formed separate from and subsequently fixed to the cap or may be formed integrally therewith.

In order that the invention may more readily be understood the following description is given, by way of example with reference to the accompanying drawings, in which:

FIGURE 20 is an elevational view of another form of cap.

FIGURE 21 is a plan view, partly broken away, of the cap of FIGURE 20 in position on the co-operating plate.

FIGURE 22 is a view of a cut-outblank employed for the production of another cap.

FIGURE 23 is a corresponding plan view of the cap formed from the blank of FIGURE 22 in position on the co-operating plate.

FIGURES 24 and 25 are transverse sections of FIGURE 23 parallel and perpendicular to the plane of the lugs.

Figure 26:
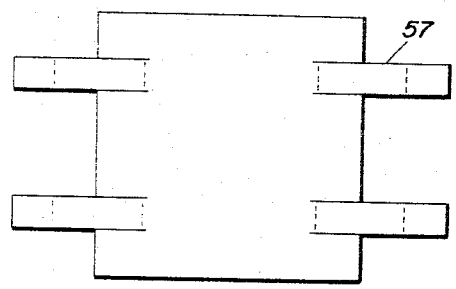
Figure 27:
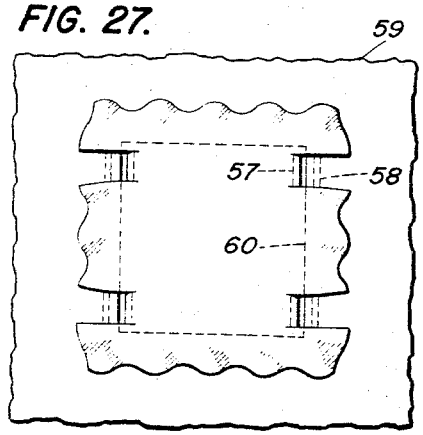
Figure 29:
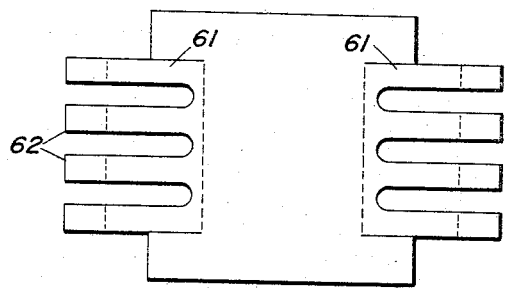
Figure 28:
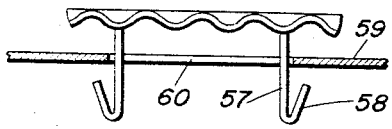

FIGURES 26 to 28, which are similar to FIGURES 22 to 24, relate to a first variant.

FIGURES 29 to 32, which are similar to FIGURES 22 to 25, relate to a second variant.

Figure 33:
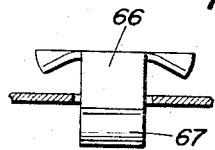
Figure 31:
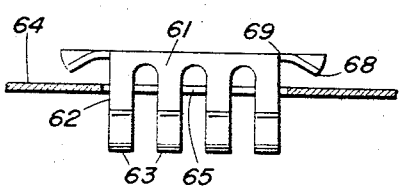
Figure 32:
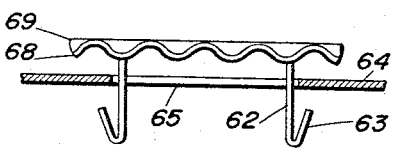

FIGURE 33, which is similar to FIGURE 31, concerns a third variant.

Figure 1:
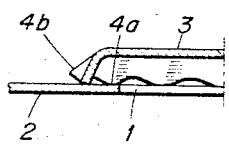
FIGURES 1 to 5 are half-sections of caps constructed in accordance with the invention and illustrated in the inoperative position on their co-operating plates.

In accordance with FIGURE 1, the cap intended to close the aperture 1 in a column plate 2 consists of a disc 3, of which the periphery has been so pressed as to comprise a series of corrugations, of which the depressed portions 4a rest on the plate 1 around the aperture 2, with the intermediate crests 4b therebetween. In order to provide larger cross-sectional areas for throughflow of the vapor between the corrugations, the crests may be in the plane of the upper face of the disc 3 (crests 4c of FIGURE 2) or may even rise above this plane (crests 4d of FIGURE 3).

Figure 2:
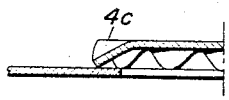
Figure 3:
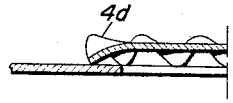
Figure 4:
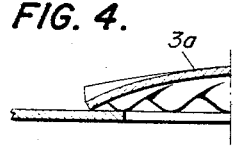
Figure 5:
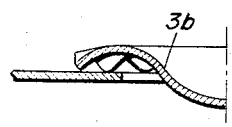

Instead of the flat disc shown in FIGURES 1 to 3, the cap may comprise a disc 3a curved in dome form as illustrated in FIGURE 4 or a disc 3b formed with a central dished portion (FIGURE 5). In the latter case, the dished portion may receive a securing member of a guide device which does not project beyond the upper portion of the disc.

Figure 6:
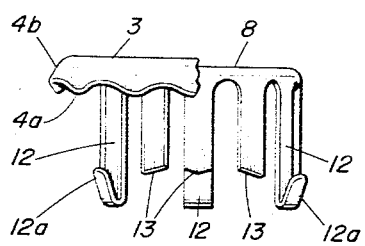
FIGURE 6 is an elevational view, half of which shows a cap according to the invention together with its guide device, and half the guide device alone.
Figure 7:
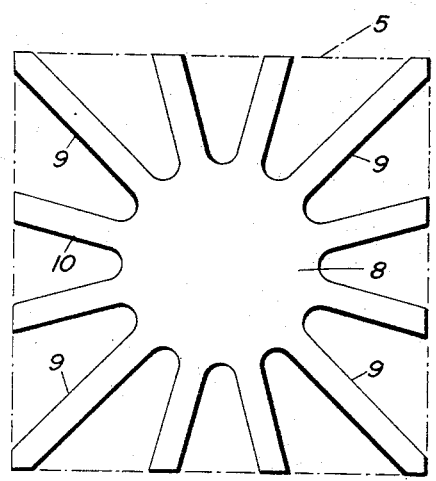
FIGURE 7 is a view of the blank from which the guide device is produced.

A guide and travel-limiting device in combination with a cap 3, 4a, 4b as shown in FIGURE 6 is formed from the sheet-metal blank 5 illustrated in FIGURE 7. The said blank 5 is of square form in the example chosen and is recessed in such manner as to define four diagonal lugs 9 extending radially from a central portion 8, and between them eight shorter teeth 10. The member thus recessed is bent over, around the periphery of the portion 8, so as to form a base which can be fixed in the cap and also, below the base, a recessed cylindrical skirt, the ends of the lugs 9 being bent back on themselves to form claws 9a. These abutments project sufficiently from the cylindrical skirt, to make it necessary for the member to be forced into an aperture in a co-operating plate, whereafter the claws return resiliently to their initial position, to form abutments limiting the upward travel of the closure member, while the remainder of the skirt ensures that the closure member is guided in its movements.

The base of the travel-guiding and limiting device may be fixed below the cap in any appropriate way, for example by welding.

Figure 8:
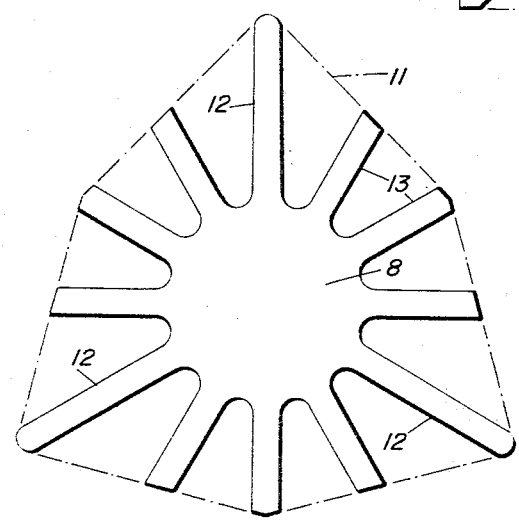
FIGURE 8 is a view similar to FIGURE 7 showing a variant.

As is shown in FIGURE 8, the travel-guiding and limiting device, while still being of the same type, may be manufactured from a blank of different shape, for example a hexagonal blank 11 having three lugs 12 and three groups of three shorter teeth 13. The number and shape of the teeth 10 and 13 and of the lugs 9 and 12 may be chosen as desired.

Figure 9:
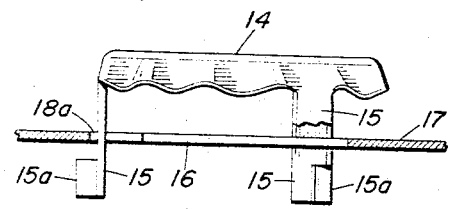
FIGURE 9 is an elevational view of a cap provided with guide lugs, the co-operating plate being shown in section.
Figure 10:
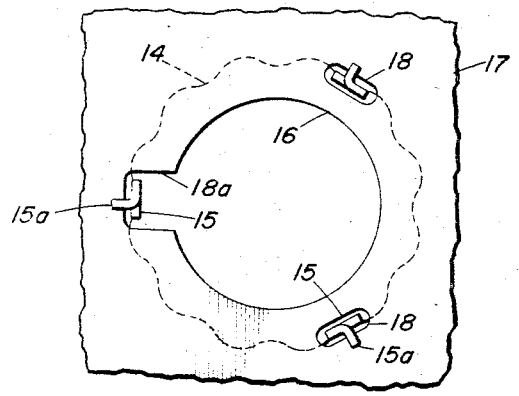
FIGURE 10 is an underneath plan of the cap and plate of FIGURE 9.

A cap 14 (FIGURES 9 and 10) having a corrugated edge may also be produced, in the same way as the guiding and travel-limiting device, from a blank having lugs 15 at intervals between the corrugated disc portions. In order that these lugs should guide the cap better than if they were simply engaged in the aperture 16 of the plate 17, a slot 18 or, preferably, a notch 18a in the aperture 16 (FIGURE 10) may be provided in the plate 17 for the passage of each one of them. With this arrangement, the number of lugs may be reduced to two. In the example illustrated in the drawings, each lug 15 has near its end, a transverse slot which enables a portion of the metal to be laterally bent over in order to form an abutment 15a after the positioning. The travel limiting may also be ensured by bending over the lugs 15 upwardly as at 9a in FIGURE 6 or horizontally as at 30a in FIGURE 18.

Figure 11:
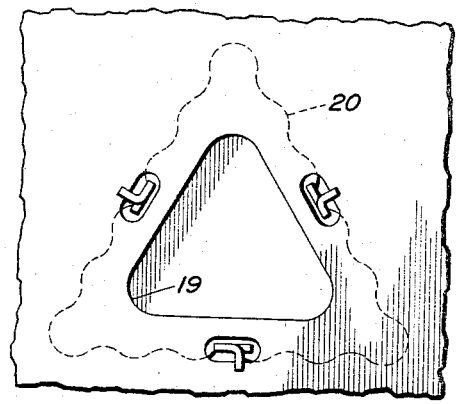
FIGURE 11 is a view similar to FIGURE 10, showing a variant.

In all the foregoing examples, the aperture in the plate and the corresponding closure member need not be of circular form. FIGURE 11 illustrates by way of example a plate aperture 19 and a cap 20, both of which are triangular.

Figure 12:
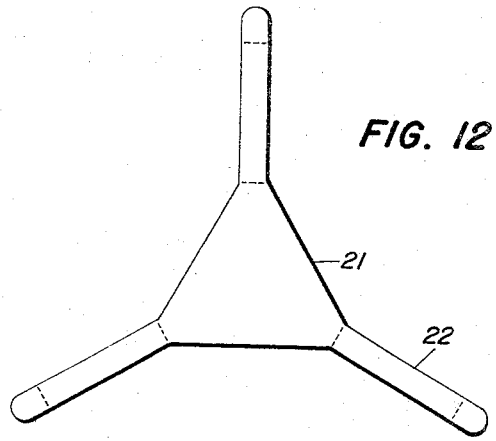
FIGURE 12 shows in plan view a blank for a simple guide device before the bending of the lugs.
Figure 13:
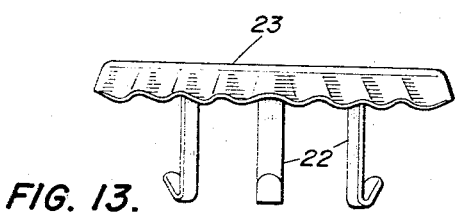
FIGURE 13 shows in elevation the cap provided with the guide device formed from the blank of FIGURE 12.
Figure 14:
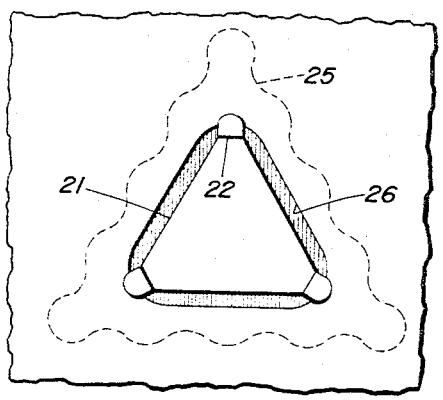
FIGURE 14 is an underneath plan view of the cap of FIGURE 13 and the co-operating plate from below.

Likewise, it is unnecessary for the cap and the base of the travel-guiding and limiting device hereinbefore described to have corresponding shapes. FIGURE 12 illustrates by way of example a device having a triangular base 21 with three lugs 22 which device may be secured under a round cap 23 having corrugated edges (FIGURE 13), while FIGURE 14 illustrates the same triangular base 21 in combination with a cap 25 also of triangular form, which is disposed above the aperture 26 in the plate.

Figure 15:
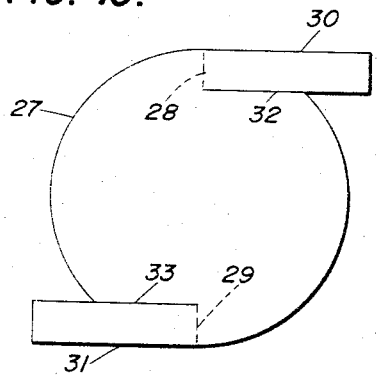
FIGURE 15 is a view similar to FIGURE 7, of a modification of blank.
Figure 16:
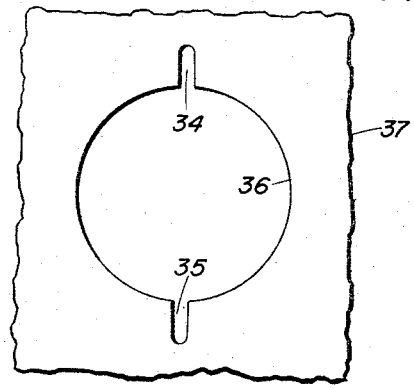
FIGURE 16 is a plan view of the plate which is to co-operate wtih a cap, fitted with the guide device formed from the blank of FIGURE 15.
Figure 17:
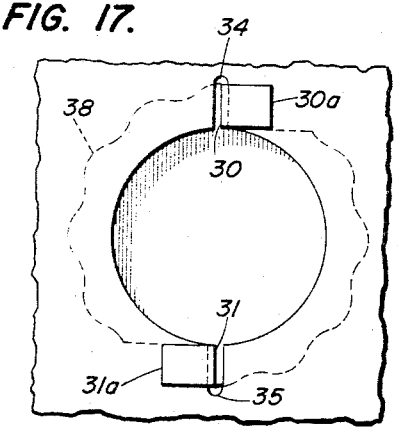
FIGURE 17 is an underneath plan view of the plate of FIGURE 16 with the cap fitted.
Figure 19:
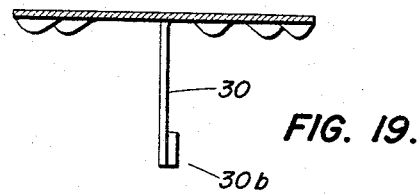
FIGURE 19 is a view similar to FIGURE 18, showing a variant.
Figure 18:
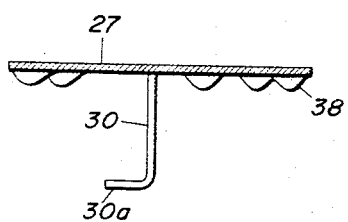
FIGURE 18 is a transverse section through the cap alone of FIGURE 17.

Instead of being cut out from the initial blank so as to extend in radial directions, the lugs may be cut out so as to extend tangentially. FIGURE 15 illustrates such a blank comprising a disc 27 which is integrally formed, along diametral bending lines 28, 29 with tangential lugs 30, 31 separated from the said disc by cuts 32, 33. After having been bent over at a right angle, the lugs are intended to be engaged in diametral guide slots 34, 35 extending from the edge of the aperture 36 in the plate 37 (FIGURES 16 and 17) and the edge of the disc is bent over to form corrugations 38 intended to rest on the plate 37 around the aperture 36. After positioning, the ends 30a, 31a of the lugs may be bent over at a right angle to form retaining claws (FIGURE 18). In a modified form, each lug may be transversely slotted close to its end and a portion of the metal bent over as indicated at 30b in FIGURE 19, in the manner hereinbefore described.

The cap illustrated in FIGURES 20 and 21 is produced, as those of FIGURES 15 to 19, from a metal blank which is cut out and then bent. Three lugs 40 are integral with the disc 41, of which the edge is corrugated, and the corresponding bending lines are slightly offset from radial. The cut 45 separating each lug from the disc is extended into the latter somewhat beyond the bending line. Each lug has in its lower portion a retaining tooth 40a externally bounded by an inclined surface 40b. The slots 42 extending around the aperture 44 in the plate 43 to receive the lugs 40 are also offset. With this arrangement, the cap is more stable in the uppermost position. In addition, it is possible to position it from above by introducing the lugs 40 into the slots 42, the lugs being resiliently retracted by the ends of the slots 42 until the inclined surfaces 40b have cleared the plate, whereafter they return to their normal position, in which the teeth 40a form abutments limiting the upward travel. The direction of each lug differs slightly from a radial direction, and the loss of pressure caused by their presence is negligible. This constructional form is advantageous by reason of the small extent of the recesses left by the lugs in the peripheral corrugations after the downward bending.

In the case of FIGURES 22 to 25, the cap and the lugs are obtained from a square blank 54 comprising two projecting portions along each of two of its opposite sides 46. Each of the projecting portions is bounded by an inclined surface 47 on the side remote from the twin projecting portion. Cuts 48, 49, 50 separate, from the square portion, a lug 51 externally terminated by a retaining tooth 52. Each of the lugs thus defined is bent through a right angle about the bending line 53, the cut 50 being sufficiently long to extend beyond the line 53 towards the interior. The rectilinear edges of the blank 54 are corrugated as described in the foregoing.

The cap thus formed is positioned as before from above in the square aperture 55 in a plate 56 (FIGS. 23 to 25).

It will be noted that the shape of the blank makes it possible to reduce the metal waste during its cutting.

A square cap of similar shape is illustrated in FIGURES 26 to 28. In this case, the lugs 57 are straight and their end is bent over to form a hook or claw 58. Here again, the positioning is effected from above the plate 59 through the aperture 60 by means of the resilience of the lugs 57.

In accordance with the modification of FIGURES 29 to 32, combs 61 are provided instead of separate lugs, each tooth 62 of the comb being bent over at its end to form a hook or claw 63, the positioning being effected from above the plate 64 through the aperture 65 by means of the resilience of the combs 61. The combs improve the dispersion of the vapor and increase the efficiency.

This modification is particularly desirable for small caps associated with square or rectangular apertures measuring, for example, 15 mm. along their shorter side. The number of teeth in the comb may then be reduced to two. A single lug 66 may even be provided terminated by a claw 67 (FIGURE 33) along two opposite sides of a square blank, the passage of vapor along the shorter side of the rectangle being sacrificed.

Figure 30:
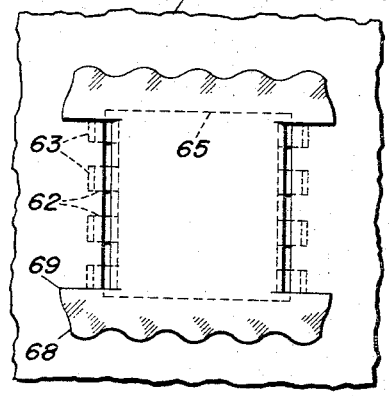

In the constructional forms of FIGURES 22 to 33, it is preferable for the corners of the blank, such as 68 in FIGURE 30, to correspond to low points of the corrugations and the ends 69 of the edges of the slots to the crests to facilitate the passage of the vapor from behind the lugs or teeth.

The constructional forms of FIGURES 22 to 33 may be applicable either to square or to rectangular blanks and apertures.

I claim:

1. A plate for a fluid exchange column, said plate having an upper surface thereof with a plurality of apertures therein, a closure element for each said aperture, each said element comprising a cap portion having a periphery of substantially the same shape as said aperture but of larger dimensions, a plurality of corrugations in a marginal portion of said cap portion extending along the entire periphery thereof defining low portions with crests therebetween, said crests extending above the upper surface of said cap portion, said low portions depending from the lower surface of said cap portion and resting on the upper surface of said plate adjacent said aperture, a plurality of teeth-like guide means attached to and depending from said cap portion and passing through said plate, said guide means being effective to guide said cap for vertical movement, means on said guide means for limiting the vertical movement of said cap, said crests being spaced from said plate surface to form together with said teeth-like guiding means, a plurality of passageways for fluid flow through said aperture from below to above said plate, said passageways acting as means to create turbulence in said vapor flow and cause a multiplicity of separate vapor jets to be discharged substantially flush with the upper surface of said plate.

2. A plate for a fluid exchange column as specified in claim 1, said guiding means being formed integral with said cap.

3. A plate for a fluid exchange column as specified in claim 1, said guiding means being formed separate from said cap, but affixed thereto.

4. A plate for a fluid exchange column as specified in claim 1, said cap being of substantially upwardly concave form.

References Cited
UNITED STATES PATENTS

| | | | |
|---|---|---|---|
| 1,315,727 | 9/1919 | Howard | 137—533.27 X |
| 3,019,003 | 1/1962 | Glitsch | 261—114 |
| 3,080,155 | 3/1963 | Glitsch et al. | 261—114 |
| 3,146,280 | 8/1964 | Forgrieve | 261—114 |
| 3,162,701 | 12/1964 | Joor | 261—114 |

FOREIGN PATENTS 1,237,299   6/1960   France.

HARRY B. THORNTON, *Primary Examiner.*

E. H. RENNER, *Assistant Examiner.*